United States Patent
Otter et al.

(10) Patent No.: US 9,802,431 B2
(45) Date of Patent: Oct. 31, 2017

(54) IMPACT DAMPING DEVICE FOR PRINT-HEAD ASSEMBLY AND PRINTING APPARATUS INCORPORATING SAME

(71) Applicant: Océ Holding B.V., Venlo (NL)

(72) Inventors: Brian D. Otter, Venlo (NL); Maarten J. H. Elferink, Vancouver (CA); Hadylee H. Wan, Langley (CA)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/395,211

(22) Filed: Dec. 30, 2016

(65) Prior Publication Data
US 2017/0197445 A1   Jul. 13, 2017

(30) Foreign Application Priority Data
Jan. 13, 2016   (EP) .................................... 16151047

(51) Int. Cl.
| | |
|---|---|
| *B41J 29/12* | (2006.01) |
| *B41J 25/304* | (2006.01) |
| *B41J 19/00* | (2006.01) |
| *F16F 7/00* | (2006.01) |
| *B41J 29/08* | (2006.01) |

(52) U.S. Cl.
CPC ............... *B41J 29/12* (2013.01); *B41J 19/00* (2013.01); *B41J 25/304* (2013.01); *B41J 29/08* (2013.01); *F16F 7/00* (2013.01)

(58) Field of Classification Search
CPC ............. B41J 29/13; B41J 29/08; B41J 29/12
See application file for complete search history.

(56) References Cited

U.S. PATENT DOCUMENTS

| | | | |
|---|---|---|---|
| 2,808,144 A | * | 10/1957 | Lambert ................... B41J 19/10 267/75 |
| 3,578,130 A | | 5/1971 | Frechette |
| 3,656,818 A | | 4/1972 | Bischoff et al. |
| 3,960,250 A | * | 6/1976 | Wiater ..................... B41J 19/10 188/281 |
| 4,394,669 A | | 7/1983 | Ozawa et al. |
| 4,543,590 A | | 9/1985 | Tazaki et al. |
| 4,672,390 A | | 6/1987 | Ishikawa |

(Continued)

FOREIGN PATENT DOCUMENTS

| | | |
|---|---|---|
| EP | 0 720 912 A2 | 7/1996 |
| EP | 1 219 446 A2 | 7/2002 |

(Continued)

*Primary Examiner* — Shelby Fidler
(74) *Attorney, Agent, or Firm* — Birch, Stewart, Kolasch & Birch, LLP

(57) ABSTRACT

A print-head assembly for a printing apparatus includes: a carriage with a frame configured to be supported on a gantry for movement in a travel direction over a print surface; a print-head unit having one or more print heads mounted on the carriage; and an impact damping device mounted on an end region of the carriage in the travel direction, wherein an impact member of the damping device presents a contact surface in the travel direction. The impact member is mounted to the carriage frame for resilient movement over a buffer distance substantially parallel to the travel direction between a first extended position and a second retracted position for absorbing or damping an impact during movement of the carriage in the travel direction.

10 Claims, 6 Drawing Sheets

(56) References Cited

U.S. PATENT DOCUMENTS

| | | | |
|---|---|---|---|
| 5,344,245 A | 9/1994 | Tajima et al. | |
| 5,924,809 A | 7/1999 | Wotton et al. | |
| 6,257,781 B1 | 7/2001 | Harris | |
| 7,283,283 B1* | 10/2007 | Sievertson | B41J 29/00 358/296 |
| 2003/0202083 A1* | 10/2003 | Deguchi | B41J 3/36 347/108 |
| 2006/0012651 A1 | 1/2006 | Lee et al. | |
| 2008/0186359 A1 | 8/2008 | Ito | |
| 2016/0167399 A1* | 6/2016 | Ohnishi | B41J 2/01 347/102 |

FOREIGN PATENT DOCUMENTS

| | | |
|---|---|---|
| EP | 1 418 054 A1 | 5/2004 |
| EP | 2 082 889 A2 | 7/2009 |
| JP | 58-201669 A | 11/1983 |
| JP | 2005178023 A * | 7/2005 |
| JP | 2010131795 A * | 6/2010 |
| WO | WO 2014/092140 A1 | 6/2014 |

\* cited by examiner

IMPACT DAMPING DEVICE FOR PRINT-HEAD ASSEMBLY AND PRINTING APPARATUS INCORPORATING SAME

FIELD OF THE INVENTION

The present invention relates to a printing apparatus, and more specifically to an impact damping device for a print-head assembly in a printing apparatus.

BACKGROUND OF THE INVENTION

A print-head assembly in a printing apparatus typically includes a carriage which is supported for movement over a printing surface. The carriage incorporates or supports a print-head unit having one or more print heads which travel over the printing surface with the carriage in a travel direction. In addition to the print-head unit, the carriage may optionally support one or more curing units for curing the ink deposited by the print heads.

To protect the print-head assembly from inadvertent contact by an operator or a foreign object on the printing surface which may block movement of the carriage, the conventional print-head assembly includes a safety fence or barrier. If or when an operator or a foreign object contacts the safety fence or barrier, thereby impeding or blocking movement of the carriage, the safety fence may trigger the carriage to stop moving (e.g. via sensors and control circuitry) to prevent any personal injury or damage to the printing apparatus. The conventional safety fence design, however, consumes space to provide for a travel length for the carriage to stop, which length is inevitably required in view of inertia of the carriage, for example. This design results in a considerable carriage length, which requires or demands for additional overrun space on opposite sides of the printing surface.

SUMMARY OF THE INVENTION

In view of the above background, an object of the present invention is to enable a new and improved print-head assembly for a printing apparatus. In particular, it would be desirable to enable a print-head assembly having a new design which requires less overrun space beyond the printing surface. It would also be desirable to save on a length of a gantry for the carriage in the printing apparatus, to reduce the required installation space, and/or to reduce the manufacturing costs.

In accordance with the present invention, an impact damping device suitable for a print-head assembly in a printing apparatus as recited in claim 1 is provided. Further, the present invention also provides a print-head assembly as recited in claim 7 and a printing system as recited in claim 8. Advantageous and/or preferred features of the invention are recited in the dependent claims.

According to one aspect, therefore, the present invention provides an impact damping device for a print-head assembly in a printing apparatus, the print-head assembly comprising a print-head carriage, wherein the carriage has a frame and the carriage is moveable in a travel direction. The impact damping device according to the present invention comprises a cover and a mounting mechanism. The cover has at least one cover panel for forming a hollow structure and comprises an impact member configured to be mounted at an end of the carriage. The impact member has a contact surface facing in the travel direction. The mounting mechanism is arranged in a hollow space formed by the hollow structure and is adapted for mounting the impact member to the frame of the carriage. The mounting mechanism is connected to the impact member to provide for movement of the contact surface over a buffer distance substantially parallel to the travel direction from a first extended position to a second retracted position for absorbing an impact during movement of the carriage in the travel direction. In normal operation, i.e. when moving without impact with e.g. a foreign object, the contact surface is in the first, extended position. Upon impact, the contact surface is moved to the second, retracted position. When the contact surface is in the retracted position, the end of the frame of the carriage is received in the hollow space.

In this way, the invention provides a retractable impact member which is mounted for movement to the second retracted position in the event of an inadvertent contact by an operator or a foreign object on the printing surface which may block movement of the carriage. According to the invention, the device may not only absorb or damp an impact with the operator or foreign object during movement of the carriage in the travel direction, but the retraction of the impact member is configured for space optimization, since the cover of the mounting mechanism is moved over the end of the frame, enabled by the hollow space of the hollow structure.

In an embodiment, the buffer distance is substantially equal to a distance between the impact member to the end of the frame of the carriage, when the contact surface is in the first position. Thus, the impact member may be configured to move to be essentially adjacent to the carriage frame in the second position. In this regard, a ratio of the buffer distance to a cover distance, i.e. a distance between the contact surface of the impact member and the end of the frame in the first position, is preferably within the range of 0.8 to 1.0, and more preferably within the range of 0.9 to 1.0. Expressed in other terms, in the second position, a spacing of the impact member from the carriage frame measured in the travel direction is preferably one tenth of the buffer distance or less. Accordingly, the impact damping device may be configured to optimize the space it consumes in the travel direction by making essentially all of this space or distance available as a buffer distance or stopping distance for the print-head assembly carriage. That is, the impact member is able to move from its first extended position to its second retracted position directly adjacent the carriage frame upon which it is mounted.

The mounting mechanism may be configured for linear displacement of the impact member relative to the carriage frame in the travel direction, optionally against a resilient bias which may, for example, be provided by one or more linearly acting spring means, such as one or more compression spring or coil spring. In this way, in the event that an operator inadvertently comes into contact with and/or obstructs the print head assembly during printing, the resilient bias of the spring means acts to provide the operator with "feedback". In particular, as the impact member moves progressively—i.e. via the interaction with the operator—to the retracted position, a reaction force it exerts on the operator progressively increases. This provides the operator with "feedback" regarding the obstruction and provides the opportunity for him/her to remove the obstruction before the print head assembly must come to a complete stop. The reaction force imparted to the operator will depend upon the spring means selected, and typically commences with a light force and increases with the extent of relative displacement of the impact member towards its retracted position. The spring force may be selected and/or adjusted to provide a suitable or comfortable "feel" as feedback for an operator.

In an embodiment, the mounting mechanism comprises at least one hinged strut which is pivotally connected to the impact member and is pivotally connected to the carriage frame. The pivoting movement of the at least one hinged strut through a predetermined pivot angle moves the impact member between the first position and the second position. The predetermined pivot angle preferably lies in the range of 10° to 80°, and more preferably in the range of 30° to 60°. In this regard, in the first position, the at least one hinged strut is preferably oriented extending upwards at an angle of about 30° to about 45° and may pivot through the predetermined pivot angle to the second position, at which it extends upwards at an angle of about 90°. In a particularly preferred form, the mounting mechanism comprises a pair of parallel hinged struts pivotally connected both to the impact member and to the carriage frame at opposite end regions of the impact member.

In an embodiment, the mounting mechanism may comprise at least one spring means to bias the impact member resiliently to the first position. In a preferred embodiment of the mounting mechanism incorporating said at least one hinged strut, the at least one spring means is configured or arranged to impart a torsional bias force to the hinged strut. In this way, if the impact member is moved progressively to the retracted position due to interaction with an obstruction, such as an operator, a reaction force exerted on the operator will typically progressively increase thereby providing the operator with "feedback" regarding the obstruction and give him/her the opportunity to remove the obstruction before the print head assembly must come to a complete stop.

In an embodiment, the impact damping device of the invention includes a warning means configured to generate a sensory signal for an operator, such as a visual signal and/or an aural signal, in the event of an obstruction. In particular, the signal preferably indicates movement of the impact member from the first position towards the second position. In this context, a visual signal may include a lamp being illuminated (e.g. steadily or in a blinking or flashing manner), and an aural signal may include an alarm tone, such as a siren, a buzzer, or a ringing tone. Accordingly, the warning means is configured to generate a warning signal and is configured to be triggered by movement of the impact member towards the second retracted position.

According to an aspect, the invention provides a print-head assembly for a printing apparatus, comprising: a carriage with a frame configured to be supported on a track, rail, or gantry for movement in a travel direction over a print surface; a print-head unit having one or more print heads mounted on the carriage; and an impact damping device according to the present invention mounted on an end region of the carriage in the travel direction.

In an embodiment, the print-head assembly includes one or more sensors and/or a control unit for sensing or detecting an impact at the contact surface of the impact member. For example, the one or more sensors may detect movement of the contact member from the first position towards the second position. As an alternative or in addition, the one or more sensors may detect pressure or strain of the impact against the contact member. Upon sensing or detecting an impact, the control unit may then control a drive mechanism of the carriage to stop moving the carriage in order to prevent or avoid the risk of personal injury or damage to the printing apparatus.

According to a further aspect, the present invention provides a printing apparatus comprising such a print-head assembly.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION OF EMBODIMENTS

Figure 1:
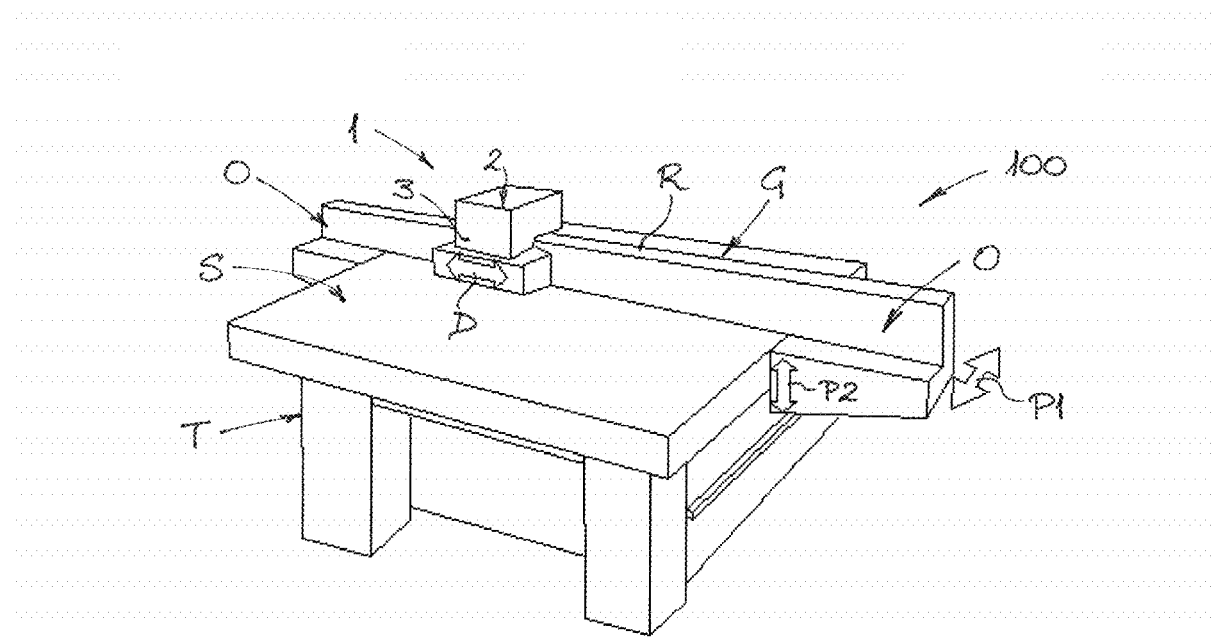
FIG. 1 is a schematic perspective view of a printing apparatus with a print-head assembly.
Figure 2:
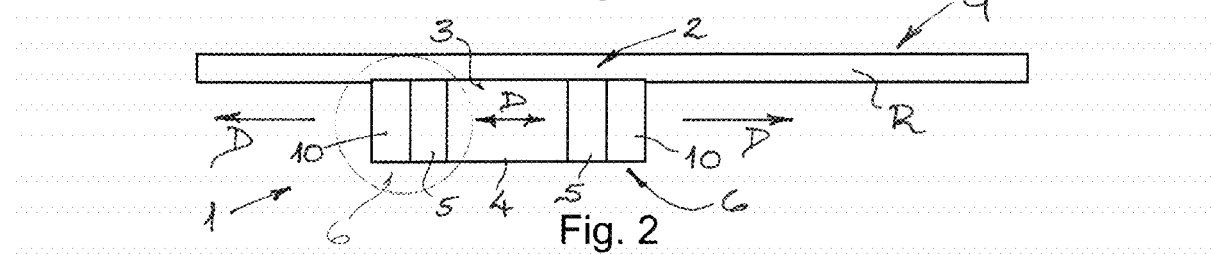
FIG. 2 is a schematic plan view of the print-head assembly in the printing apparatus of FIG. 1.

With reference firstly to FIG. 1 and FIG. 2 of the drawings, a printing apparatus 100 is shown comprising a table T having a flat upper printing surface S upon which the print medium (not shown) is supported during the printing process. Extending over or across the printing surface S is a gantry G which provides a track or rail R upon which a print-head assembly 1 is movably supported. In this way, the print-head assembly 1 is able to move back and forth in travel directions D along the track or rail R of the gantry G across the printing surface S. In a typical printing apparatus 100, the print-head assembly 1 may have a mass of about 100 kg and the width of the printing area may be 3 or 4 meters. The gantry provides an over-run area O on both ends of the track or rail R so that the print-head assembly 1 is able to use a maximum of the printing surface S available. As is apparent from the double-headed arrows P1, P2 in FIG. 1, positional adjustment of the gantry G with respect to the table T and the printing surface S is possible.

Referring further to drawing FIGS. 1 and 2, the print-head assembly 1 comprises a carriage 2 having a frame 3 which is configured to be supported or mounted on the track or rail R of the gantry G for movement in the travel directions D over the print surface S. The carriage 2 supports or accommodates a print-head unit 4 having one or more print heads (not shown) mounted centrally on the carriage frame 3. At opposite sides or ends of the print-head unit 4 in the travel directions D, a curing unit 5 is provided for mounted on the frame 3 of the carriage 2 for curing the ink deposited by the print head unit 4. In this regard, the ink is typically sensitive to UV light and each curing unit 5 may thus include UV lamps (not shown) for irradiating and curing the ink deposited onto the print medium. Adjacent to the curing units 5 at opposite end regions 6 of the carriage 2 in the travel directions D, a respective impact damping device 10 is provided. The end region 6 of the carriage 2 circled in FIG. 2 is illustrated schematically in FIG. 3 and FIG. 4 to illustrate the nature of the impact damping device 10 more fully. The same applies at the other end region 6.

Figures 3, 4:
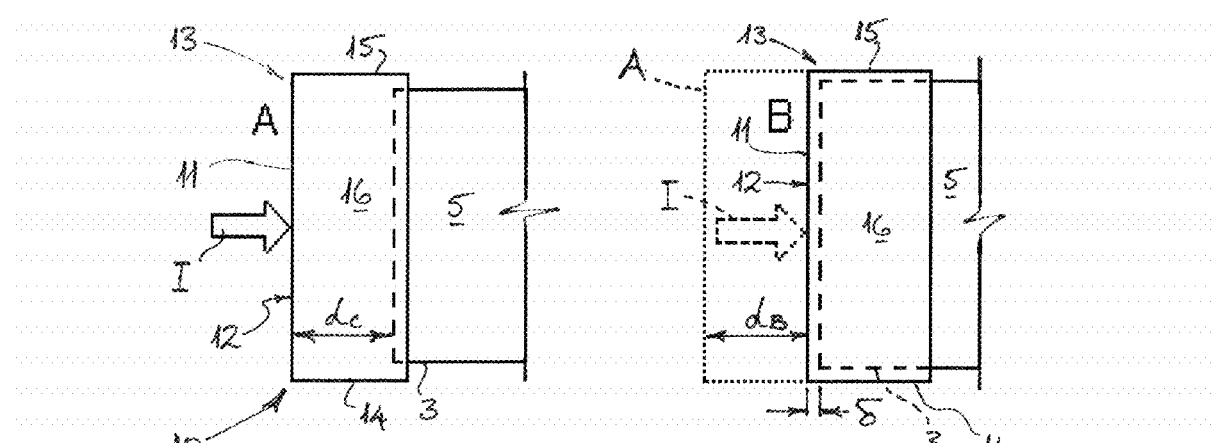
FIG. 3 is a schematic plan view of part of the print-head assembly shown in FIG. 2 illustrating an impact damping device according to one simple embodiment in a first extended position.
FIG. 4 is a schematic plan view of part of the print-head assembly shown in FIG. 2 illustrating an impact damping device according to one simple embodiment in a second retracted position.
Figure 5:
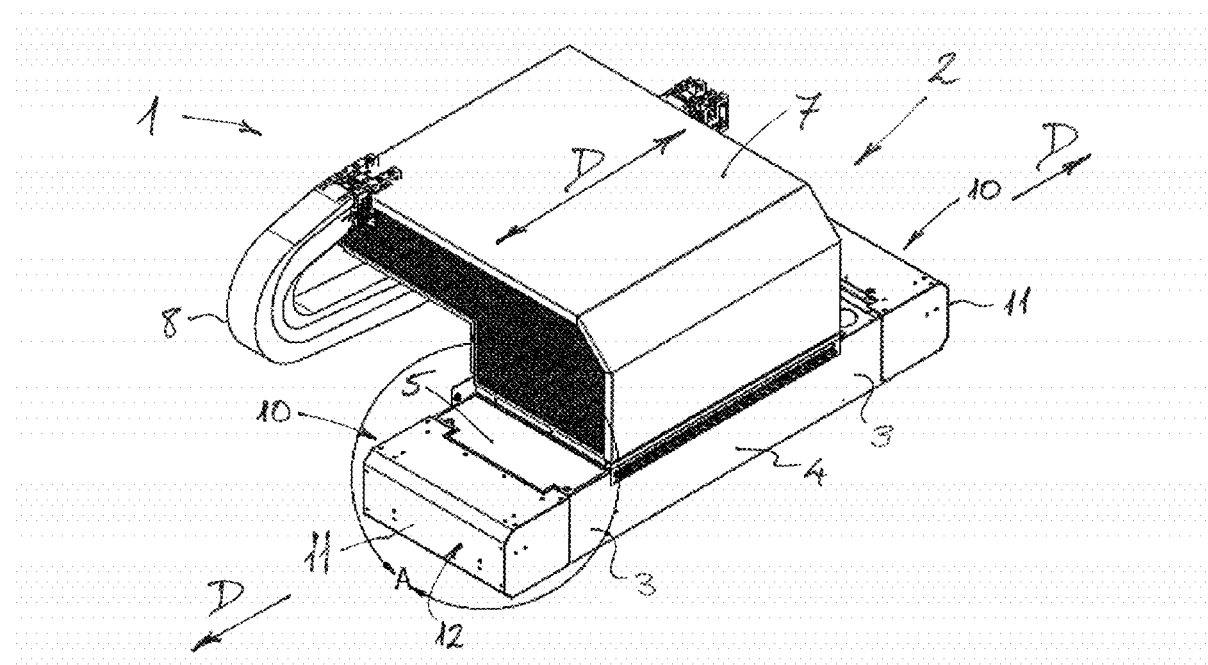
FIG. 5 is a perspective view of a print-head assembly in a printing apparatus with an impact damping device according to a preferred embodiment in a first extended position.
Figure 6:
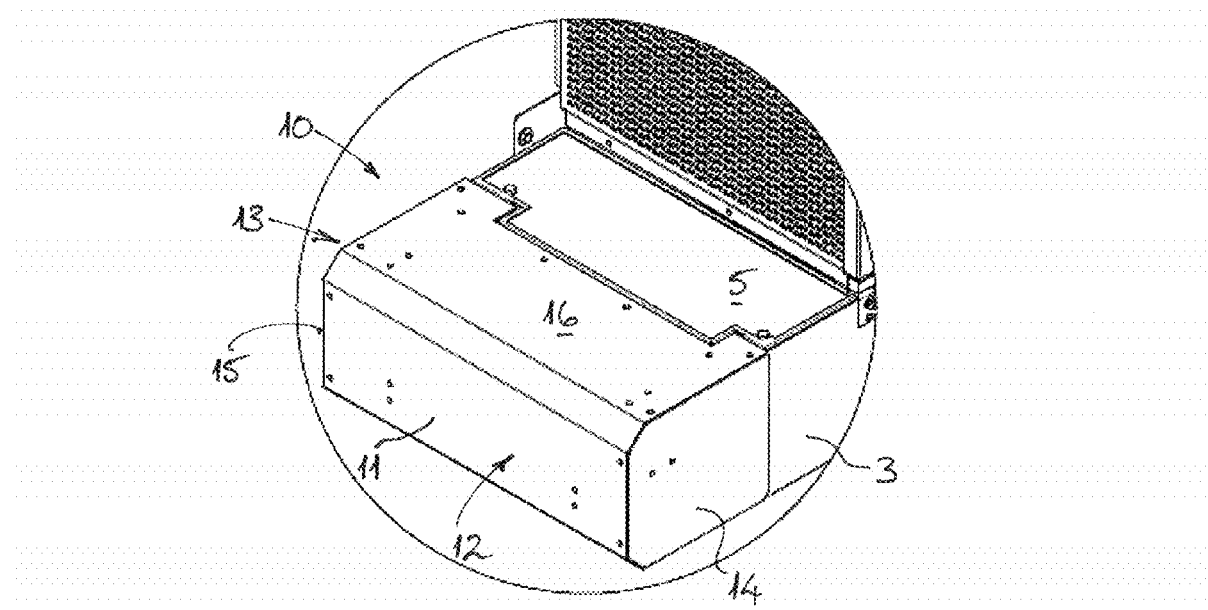
FIG. 6 is a detailed perspective view of the impact damping device in FIG. 5 in the first position.
Figure 7:
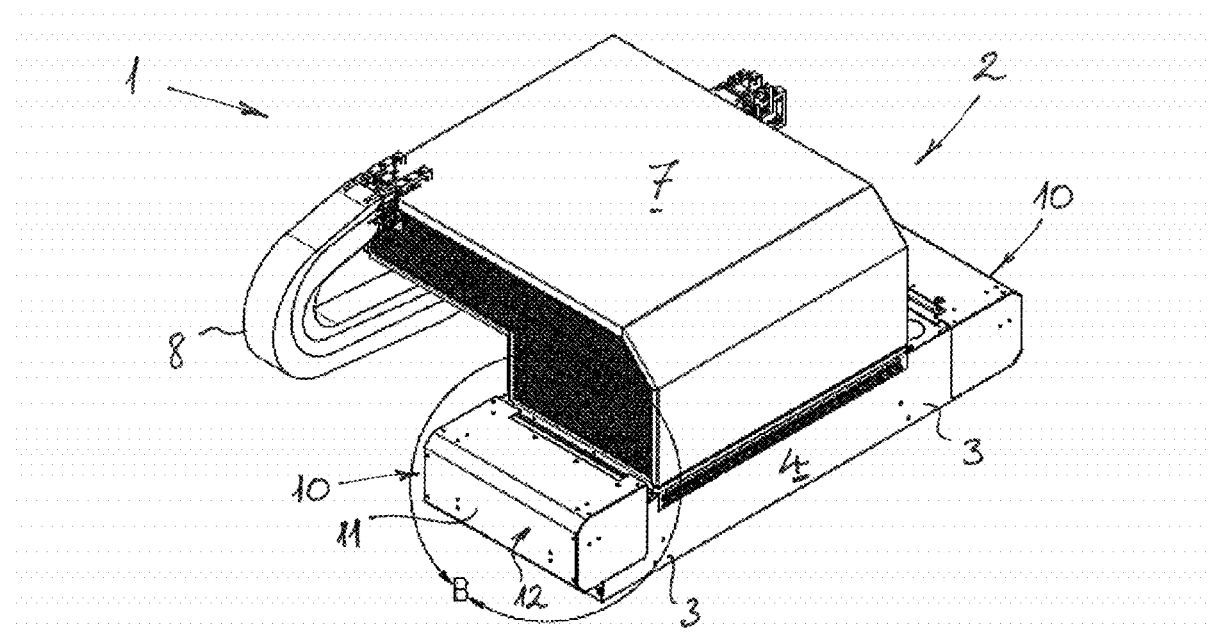
FIG. 7 is a perspective view of a print-head assembly in a printing apparatus with the impact damping device according to a preferred embodiment in a second retracted position.
Figure 8:
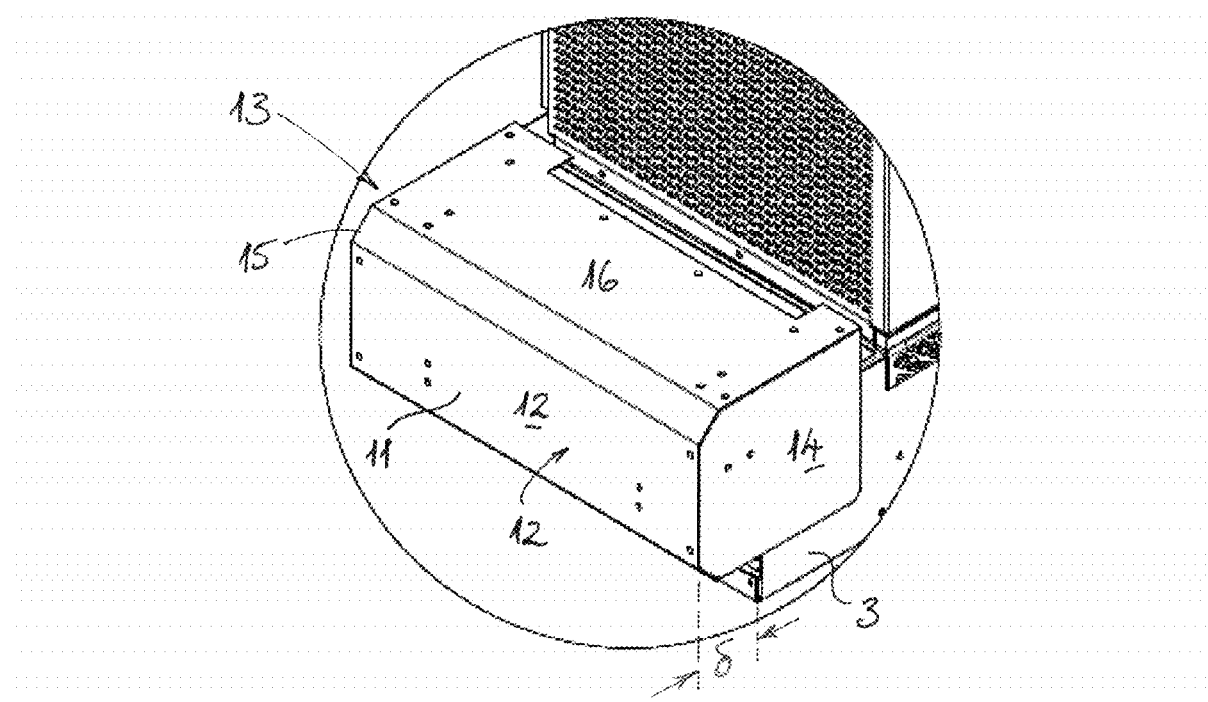
FIG. 8 is a detailed perspective view of the impact damping device in FIG. 7 in the second position.
Figure 9:
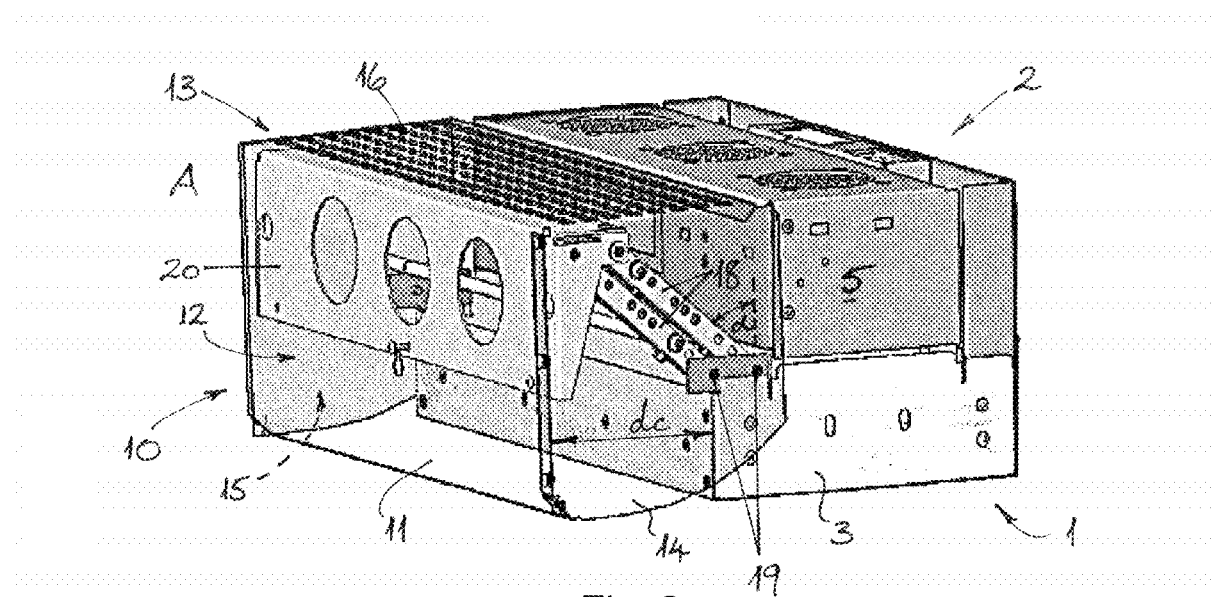
FIG. 9 is a perspective view of a print-head assembly in a printing apparatus illustrating the mounting mechanism of the impact damping device in the first extended position.

With reference to drawing FIGS. 3 and 4, the impact damping device 10 includes an impact member 11 in the form of a generally flat panel which presents a planar or flat contact surface 12 facing in the travel direction D. The impact member 11 is or forms an end panel or wall of a cowling or cover 13 that has a generally hollow structure or box-like configuration, enclosing a hollow space. That cowling or cover 13 thus also includes a front panel or wall 14, a rear panel or wall 15, and a top panel or wall 16. The end panel or wall 11 is referred to as the "impact member" because it is the part of the cowling or cover 13 facing in the travel direction D against which a foreign object may inadvertently impact or collide during movement of the carriage 2 across the printing surface S on the gantry G. As part of the cowling or cover 13, the impact member 11 is mounted or supported on the frame 3 of the carriage 2 for resilient movement over a buffer distance $d_B$ in a direction generally parallel to the travel direction D between a first extended position A (shown in FIG. 3) and a second retracted position B (shown in FIG. 4) for absorbing an impact (denoted by arrow I) against the contact surface 12 during movement of the carriage 2 in the travel direction D.

As can be seen in FIG. 4, in the second position B, the impact member 11 together with the whole cowling or cover 13 is retracted over and covers the end region 6 of the carriage 2 upon which it is mounted or, in other words, the end region 6 is received in the hollow space enclosed by the cover 13. In doing so, a buffer distance ($d_B$) over which the impact is absorbed or damped is approximately the same as a distance of the impact member 11 from the frame 3 of the carriage 2 in the first position A. More specifically, a ratio of the buffer distance $d_B$ to a distance $d_C$ that the contact surface 12 of the end panel 11 is spaced from the frame 3 in the first position A is within the range of 0.9 to 1.0. Thus, in the second position B, a spacing δ of the impact member 11 from the carriage frame 3 measured in the travel direction D is preferably less than one tenth of the buffer distance $d_B$. Accordingly, the impact member 11 is moved to be directly adjacent to the carriage frame 3 (or the curing unit 5 mounted on the carriage frame 3) in the second position B.

With reference to FIGS. 5 to 8 of the drawings, a more detailed example of a print-head assembly 1 in a printing apparatus 100 is shown embodying the concept described above with reference to FIGS. 1 to 4. Thus, like reference character are used in FIGS. 5 to 8 to designate like parts and a repetition of the same description will be avoided for the sake of economy. In this embodiment, it will be noted that the carriage 2 comprises an upper housing 7 which forms part of the frame 3. The upper housing 7 may enclose a drive mechanism for moving the carriage 2 of the print-head assembly 1 along the track R across the printing surface S as well as a control unit for controlling that movement and operation of the print head unit 4 and the curing units 5. An elongate extendable cable 8 supplies the print-head assembly 1 with electrical power during operation. With reference to the drawing FIGS. 6 and 8, it will also be noted that, in moving from the extended first position A to the retracted second position B, the impact member 11 (and indeed the whole cowling or cover 13) is not only moved or displaced in the horizontal direction of travel D by buffer distance $d_B$. but also undergoes a small vertical displacement. The reason for this vertical displacement will become clear with reference to the drawing FIGS. 9 to 12.

Figure 10:
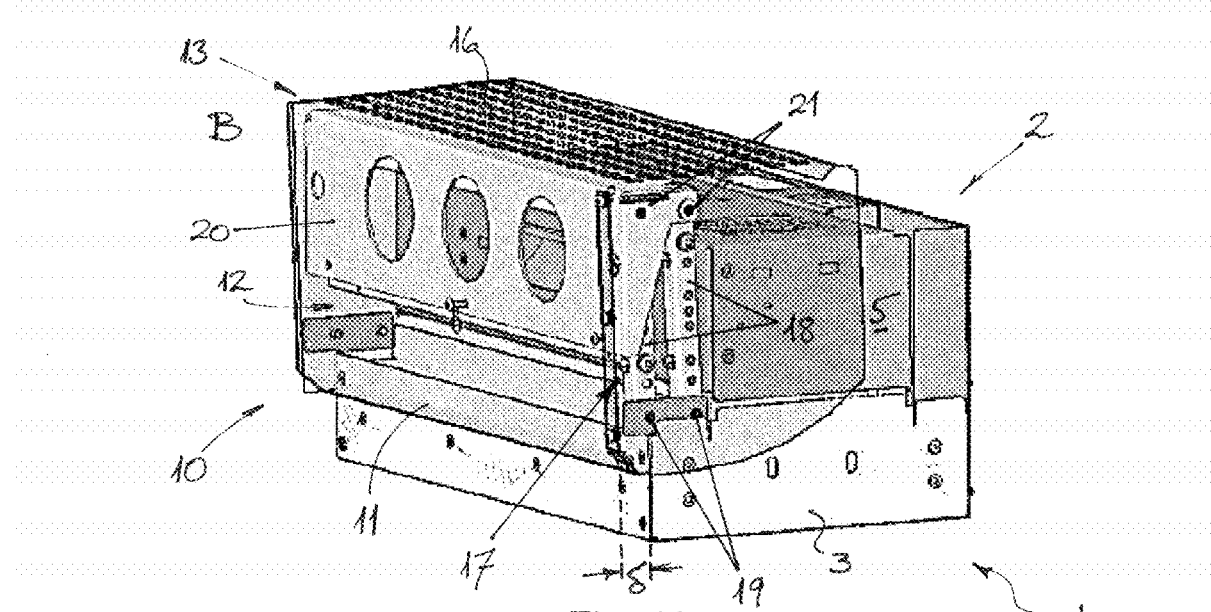
FIG. 10 is a perspective view of a print-head assembly in a printing apparatus illustrating the mounting mechanism of the impact damping device in the second retracted position.

Referring to drawing FIGS. 9 to 12, the cowling or cover 13 is illustrated transparent to reveal details of an embodiment of a mounting mechanism 17 with which the cowling or cover 13, and thus the impact member 11, is mounted to the frame 3 at the end region 6 of the carriage 2 for, in this embodiment, resilient movement between the first position A (shown in FIG. 9) and the second position B (shown in FIG. 10). The mounting mechanism 17 is arranged in the hollow space of the hollow structure formed by the cover 13. In particular, it can be seen that the mounting mechanism 17 comprises two pairs of parallel hinged struts 18 pivotally connected both to the frame 3 of the carriage 2 at pivot points 19 and to the impact member 11 via a support element 20 within the cowling 13 via pivot points 21 in the front and rear panels or walls 14, 15 each of which join the impact member 11 at opposite end regions thereof. The pivoting movement of the struts 18 through a predetermined pivot angle a moves the cowling 13 between the first position A and the second position B. The predetermined pivot angle a in this embodiment is about 45°. In the first position A shown in FIG. 9, the struts are oriented extending upwards at an angle of about 45° and pivot through predetermined pivot angle a to the second position B shown in FIG. 10, at which they extend essentially vertically upwards at an angle of about 90°.

Figure 11:
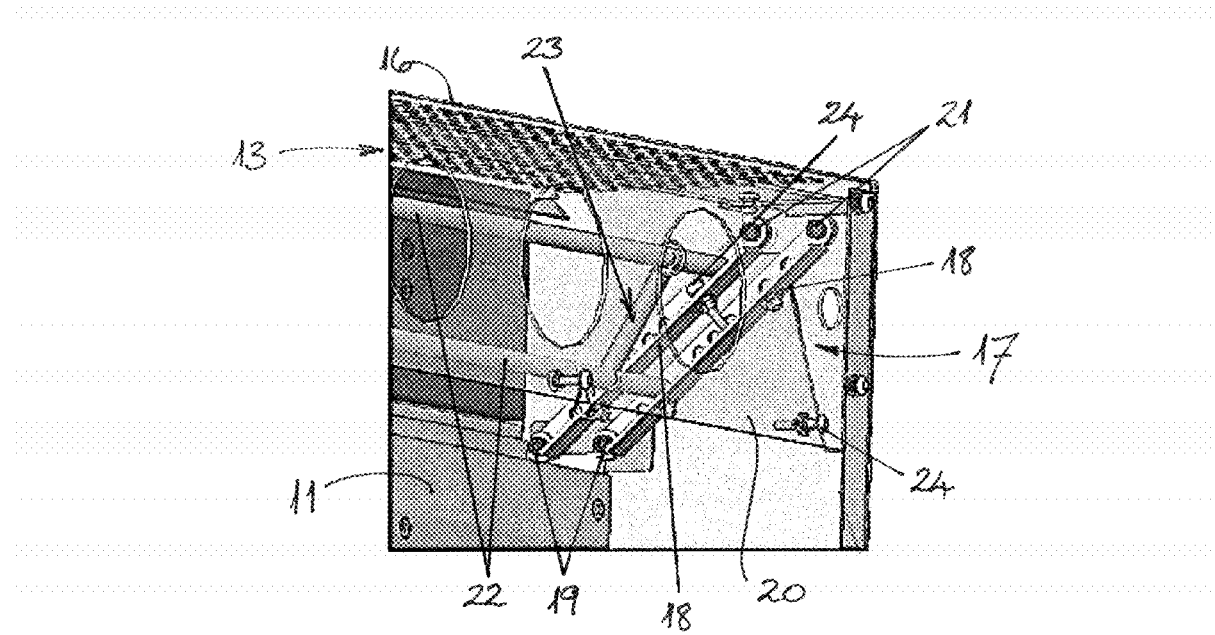
FIG. 11 is a detailed perspective view of the mounting mechanism of the impact damping device in FIGS. 9 and 10.
Figure 12:
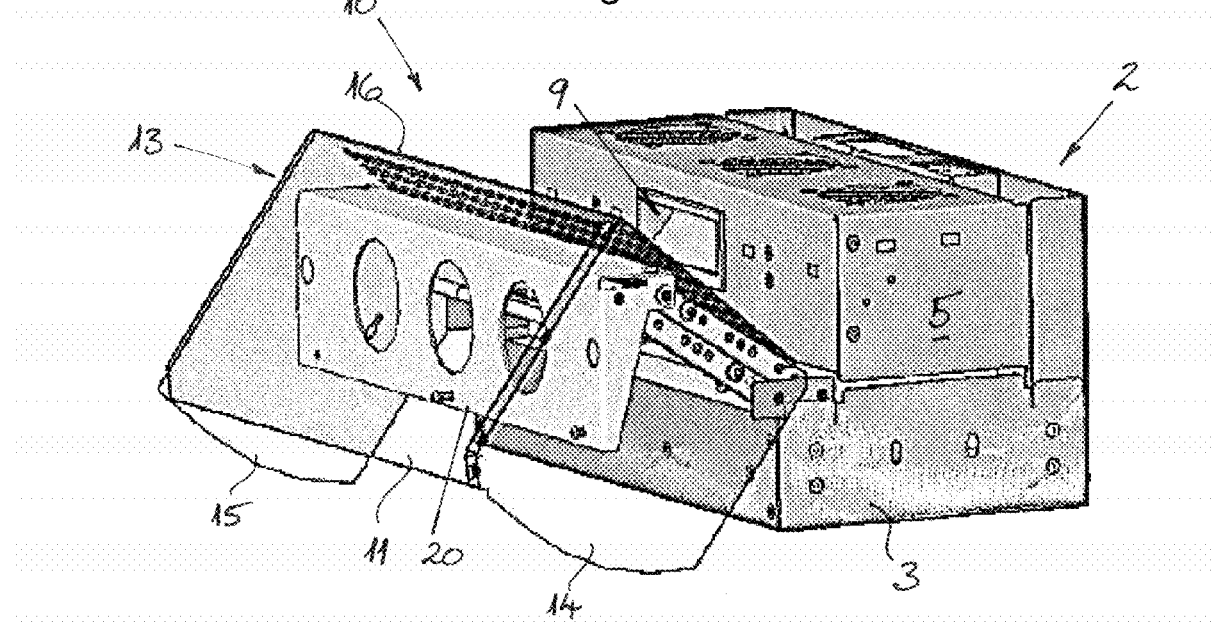
FIG. 12 is a perspective view of the impact damping device in FIGS. 9 and 10 tilted to a service or access position.

As can be seen in FIG. 11, the mounting mechanism 17 includes torsion bars or rods 22 which extend between and interconnect the respectively opposite struts 18 of the strut pairs. At least one spring 23 is furthermore provided to bias resiliently the cowling 13, and thus also the impact member 11, towards the first position A. In this way, the at least one spring 23 is configured and arranged to impart a rotary or torsional bias force to the hinged struts 18 about the pivot points 19, 21 against movement of the cowling 13 to the second position B. This provides resilience to the movement of the impact member 11 allowing damping of the impact I and then later an automatic return to the first position A. Also, in the event that an operator inadvertently obstructs the print head assembly 1 during printing, the bias of the spring 23 exerts a reaction force on the operator which progressively increases as the impact member moves progressively to the retracted position, and so provides the operator with "feedback" regarding the obstruction. Alignment screws 24 are provided for providing fine adjustment to the position of the cowling 13, and thus the impact member 11, in the first and second positions. For maintenance access to the UV lamps of the curing unit 5, the screws 24 can be released to allow the cowling 13 to pivot into the position shown in FIG. 12. In this position, an operator can access a handle 9 for opening a casing of the curing unit 5.

Figure 13:
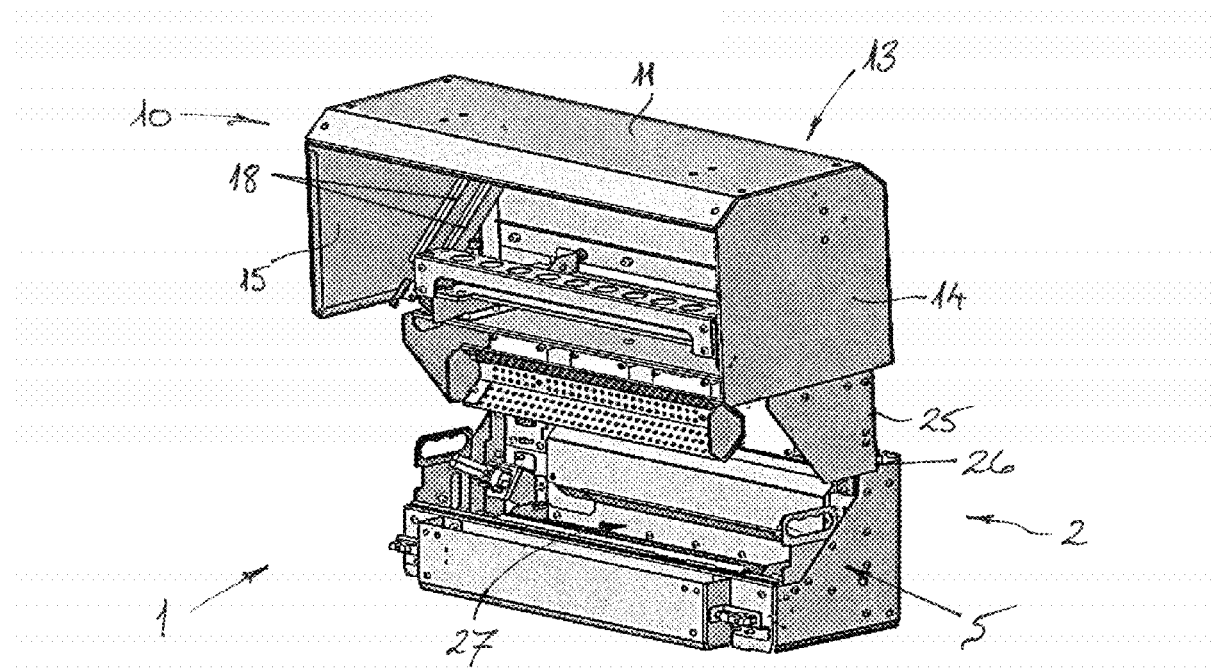
FIG. 13 is a perspective front view of an impact damping device according to another embodiment in an open, service or access position.
Figure 14:
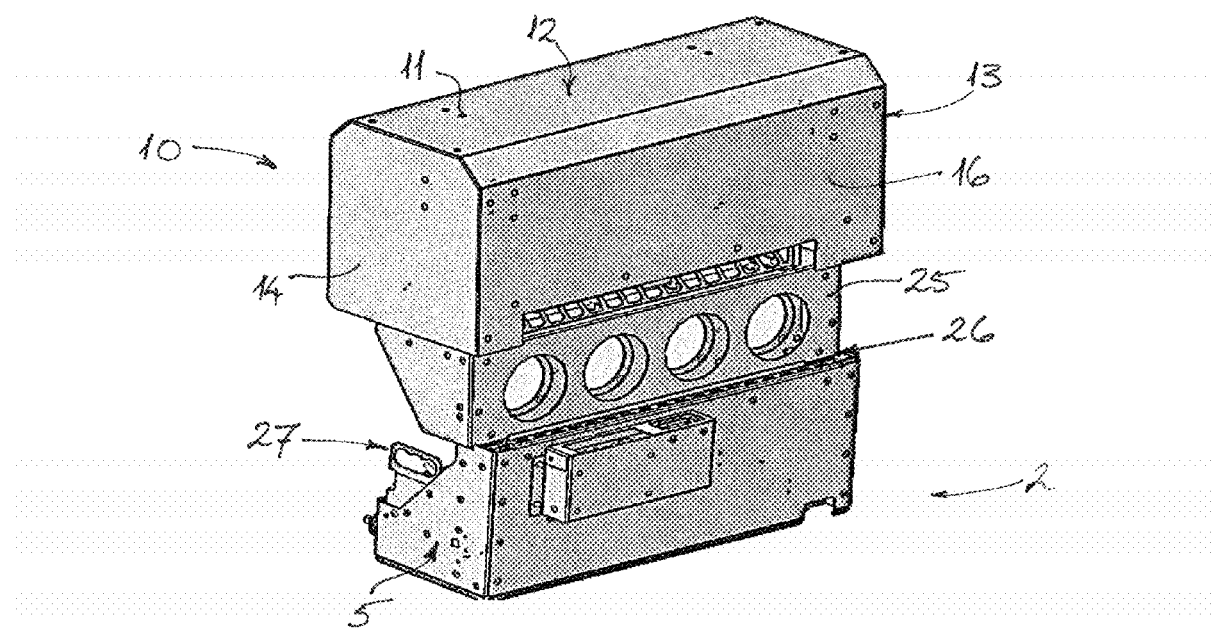
FIG. 14 is a perspective rear view of the impact damping device according to the embodiment in FIG. 13 in the open service or access position.

With reference to drawing FIGS. 13 and 14, an alternative preferred embodiment of the impact damping device 10 is illustrated. The main differences in this device 10 do not relate to the manner in which either the impact member 11 or the mounting mechanism 17 Is configured or operates, which remains essentially as described above with reference to FIGS. 1 to 10. Rather, the differences in this embodiment relate to the manner in which the impact member 11 can be opened for accessing the UV-lamps of the curing unit 5. In particular, an upper part 25 of a casing of the curing unit 5, upon which the cowling 13 is mounted, includes a hinge 26 which extends laterally thereof. In this way, during a maintenance procedure, an operator may use the cowling 13 as a lever or handle for pivotally opening or accessing a lamp chamber 27 of the curing unit 5. This facilitates ready access to the chamber 27 for replacing or servicing the UV-lamps of the curing unit 5.

Although specific embodiments of the invention are illustrated and described herein, it will be appreciated by those of ordinary skill in the art that a variety of alternate and/or equivalent implementations exist. For example, while the present invention is described in combination with and suitable for use in a printing apparatus, it will be appreciated by those skilled in the art that the impact damping device of the present invention may be used in any apparatus having a moveably arranged unit that may come inadvertently in contact with an operator or a foreign object, which could impede or block such movement. Similarly, it should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. An impact damping device for a print-head assembly in a printing apparatus, the print-head assembly comprising a print-head carriage, the carriage having a frame and being moveable in a travel direction, the impact damping device comprising:
   a cover having at least one cover panel for forming a hollow structure and comprising an impact member configured to be mounted at an end of the carriage, the impact member having a contact surface facing in the travel direction; and
   a mounting mechanism arranged in a hollow space formed by the hollow structure and adapted for mounting the impact member to the frame of the carriage, the mounting mechanism being connected to the impact member to provide for movement of the contact surface over a buffer distance substantially parallel to the travel direction from a first extended position to a second retracted position for absorbing an impact during movement of the carriage in the travel direction,
   wherein, in normal operation, the contact surface is in the first, extended position and, upon impact, is moved to the second, retracted position, and
   wherein the end of the frame of the carriage is received in the hollow space, when the contact surface is in the retracted position.

2. The impact damping device according to claim 1, wherein the buffer distance is substantially equal to a distance between the impact member and the end of the frame of the carriage, when the contact surface is in the first position.

3. The impact damping device according to claim 2, wherein a cover distance is a distance between the contact surface of the impact member to the end of the frame in the first position and wherein a ratio of the buffer distance to the cover distance is within the range of 0.8 to 1.0.

4. The impact damping device according to claim 1, wherein the mounting mechanism comprises at least one hinged strut which is pivotally connected, directly or indirectly, to the impact member and is pivotally connected to the carriage frame, wherein pivoting movement of the at least one hinged strut through a predetermined pivot angle moves the impact member between the first position and the second position, and wherein the predetermined pivot angle lies in the range of 10° to 80°.

5. The impact damping device according to claim 4, wherein the mounting mechanism comprises a pair of parallel hinged struts pivotally connected, directly or indirectly, to the impact member and pivotally connected to the carriage frame at opposite end regions of the impact member.

6. The impact damping device according to claim 1, wherein the mounting mechanism comprises at least one spring to bias the impact member resiliently to the first position.

7. A print-head assembly for a printing apparatus, comprising:
   a carriage comprising a frame configured to be supported on a track for movement in a travel direction over a printing surface;
   a print-head unit having one or more print heads mounted on the carriage; and
   the impact damping device according to claim 1, the impact damping device being mounted to the carriage frame.

8. A printing apparatus comprising the print-head assembly according to claim 7.

9. The impact damping device according to claim 2, wherein a cover distance is a distance between the contact surface of the impact member to the end of the frame in the first position and wherein a ratio of the buffer distance to the cover distance is within the range of 0.9 to 1.0.

10. The impact damping device according to claim 1, wherein the mounting mechanism comprises at least one hinged strut which is pivotally connected, directly or indirectly, to the impact member and is pivotally connected to the carriage frame, wherein pivoting movement of the at least one hinged strut through a predetermined pivot angle moves the impact member between the first position and the second position, and wherein the predetermined pivot angle lies in the range of 30° to 60°.

* * * * *